US012785793B2

(12) United States Patent
Wyler

(10) Patent No.: US 12,785,793 B2
(45) Date of Patent: Nov. 3, 2026

(54) RAPID ACQUISITION OF ADDITIONAL RESOURCES FOR A SATELLITE COMMUNICATIONS SERVICE THAT IS PROVIDED TO AN ENTITY

(71) Applicant: WILDSTAR, LLC, Saratoga, CA (US)

(72) Inventor: Gregory Thane Wyler, Stuart, FL (US)

(73) Assignee: WildStar LLC, Arlington, TX (US)

( * ) Notice: Subject to any disclaimer, the term of this patent is extended or adjusted under 35 U.S.C. 154(b) by 314 days.

(21) Appl. No.: 18/736,694

(22) Filed: Jun. 7, 2024

(65) Prior Publication Data

US 2025/0088264 A1 Mar. 13, 2025

Related U.S. Application Data

(60) Provisional application No. 63/582,238, filed on Sep. 12, 2023.

(51) Int. Cl.
*H04B 7/185* (2006.01)
*H04W 12/06* (2021.01)
*H04W 72/51* (2023.01)
*H04W 84/06* (2009.01)

(52) U.S. Cl.
CPC ..... *H04B 7/18519* (2013.01); *H04B 7/18521* (2013.01); *H04B 7/18539* (2013.01); *H04B 7/1855* (2013.01); *H04W 12/06* (2013.01); *H04W 72/51* (2023.01); *H04W 84/06* (2013.01)

(58) Field of Classification Search
None
See application file for complete search history.

(56) References Cited

U.S. PATENT DOCUMENTS

2019/0074894 A1* 3/2019 Gopal ................ H04B 7/18513
2021/0068181 A1* 3/2021 Szilágyi .................. H04W 4/46

FOREIGN PATENT DOCUMENTS

WO 2021262753 A1 12/2021

OTHER PUBLICATIONS

Fontanesi et al., "Artificial Intelligence for Satellite Communication and Non-Terrestrial Networks: A Survey" Arxiv.Org., Cornell University Library, Apr. 25, 2023, pp. 1-59.
Wheatman et al., "QoE-Analysis of 5G Network Resource Allocation Schemes for Competitive Multi-User Video Streaming Applications," 2023 IEEE 97th Vehicular Technology Conference, Jun. 20, 2023, pp. 1-6.
International Application No. PCT/US2024/033011, International Search Report and Written Opinion mailed Oct. 14, 2024, 13 pages.
Wu et al., "Dynamic and Static Controller Placement in Software-Defined Satellite Networking," ACTA Astronautica, Pergamon Press, vol. 152, Jul. 20, 2018, pp. 49-58.
International Application No. PCT/US2024/033006, International Search Report and Written Opinion mailed Oct. 31, 2024, 10 pages.

* cited by examiner

*Primary Examiner* — Phirin Sam
(74) *Attorney, Agent, or Firm* — Erin P. Madill

(57) ABSTRACT

One aspect of the disclosed technology is generally directed to rapid acquisition of additional resources for a satellite communications service that is provided to an entity.

20 Claims, 12 Drawing Sheets

100

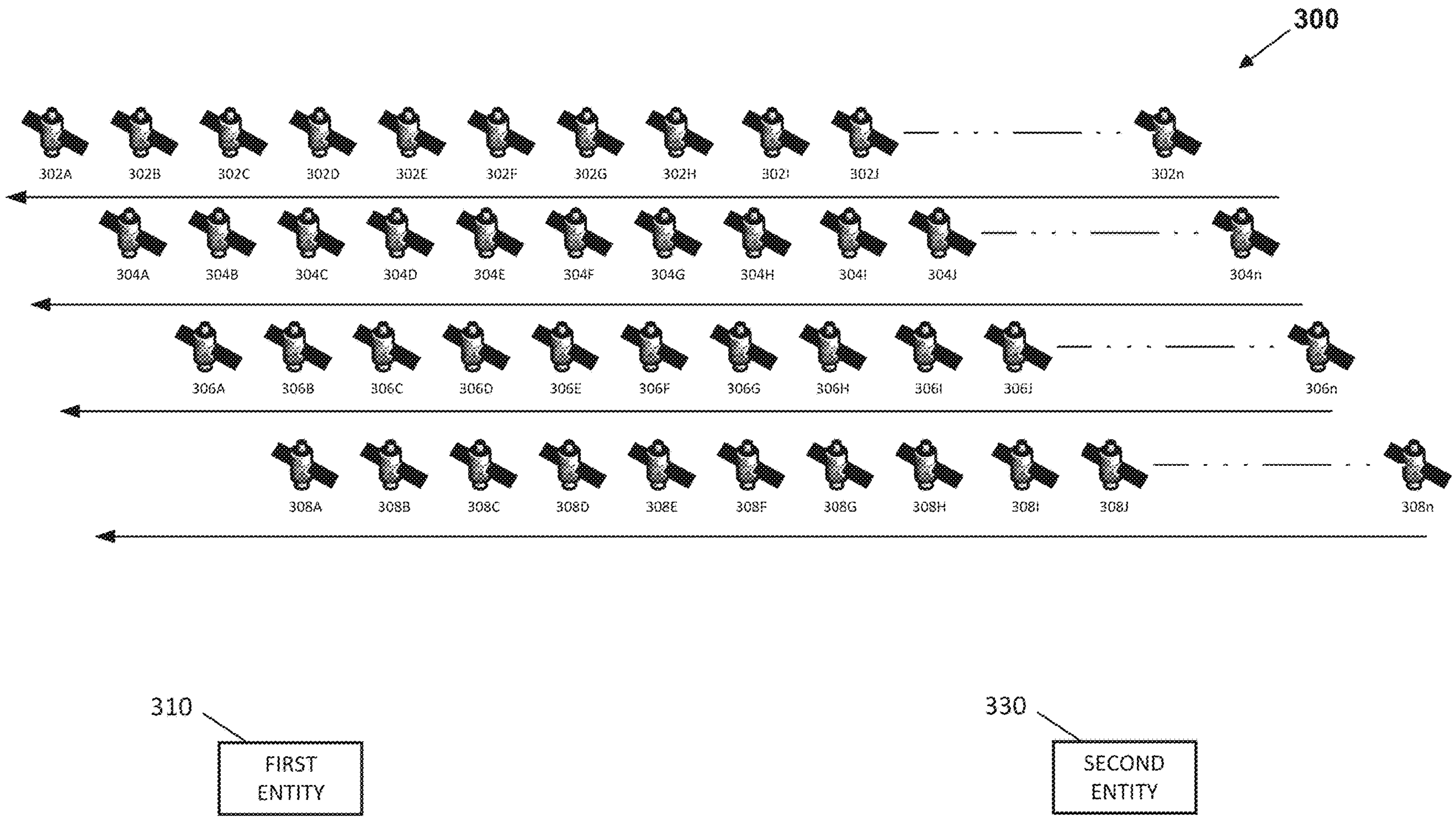

Satellites 302, 304, 306, 308 are part of a constellation of satellites. Access privileges for a subset of satellites 302, 304 are initially assigned to the "first" entity 210 such that usage of the subset of satellites 302, 304 is initially controlled exclusively by the first entity 210.

Access privileges for the subset of satellites 306, 308 are assigned to the "second" entity 230 such that usage of the subset of satellites 306, 308 is controlled exclusively by the second entity 230. Second entity 230 needs additional capacity or bandwidth and therefore need to acquire privileges to use additional satellites of the constellation.

*FIG. 3*

RAPID ACQUISITION OF ADDITIONAL RESOURCES FOR A SATELLITE COMMUNICATIONS SERVICE THAT IS PROVIDED TO AN ENTITY

CROSS REFERENCE TO RELATED APPLICATIONS

This application claims the benefit of U.S. Provisional Application Ser. No. 63/582,238, filed on Sep. 12, 2023, the disclosure of which is incorporated herein by reference.

TECHNICAL FIELD

An aspect of this disclosure is directed to satellite constellations, and more particularly, to rapid acquisition of additional resources for a satellite communications service that is provided to an entity.

BACKGROUND

Satellite as a Service (Saas), sometimes also referred to as Constellation as a Service (CaaS), refers to the provision of satellite-based services and data to customers over a satellite constellation on a subscription or pay-per-use basis, making it accessible to a wide range of customers, including businesses, governments, and individuals. In SaaS/CaaS, customers do not need to invest in their own satellite infrastructure. Instead, they may subscribe to a service provided by a satellite operator or a third-party provider, who own and operate the satellite infrastructure. The service provider is responsible for operating and maintaining the satellites and ground stations, and for delivering the data and services to customers.

SaaS/CaaS provides customers with access to a range of services, including communication, navigation, remote sensing, earth observation, data transmission, data processing, among others. SaaS/CaaS can be used in a wide range of applications, including agriculture, environmental monitoring, transportation, and disaster response, among others. In CaaS, data is typically collected by the satellites in the constellation and then transmitted to ground stations for processing and distribution to customers. CaaS providers may also offer value-added services, such as data analysis, image processing, and other applications.

SaaS/CaaS thus provides customers with a convenient and cost-effective way to access satellite data and services without the need to invest in their own satellite infrastructure. Customers only pay for what they use. This can help to lower the barrier to entry for businesses and organizations that would otherwise not be able to afford their own satellite infrastructure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations of the described techniques may include hardware, a method or process, or a computer tangible medium.

In one general aspect, a method is provided for rapid acquisition of additional resources for a satellite communications service that is provided to an entity, which may be referred to below as a first entity for sake of discussion. As an example, the satellite communication service may be a narrowband satellite communication service that is designed to support relatively low data rate transmissions. The satellite communication service may be provided to the first entity via a first constellation of satellites, and at a given time, be provided at a "first service level" or first level of service that is bound by defined levels of performance. As an example, the first service level may have first defined levels of quality, availability, and/or reliability of the satellite communication service being provided. To achieve the defined levels, the first service level provides a first set of resources that are assigned to the first entity. The first set of resources are adequate to satisfy the first defined levels of quality, availability, and/or reliability of the satellite communication service being provided.

In accordance with the method, a core network of the constellation of satellites may continuously monitor usage of first set of resources by the first entity and determine whether a current demand for resources exceeds capability of the first set of resources provided under the first service level. When the current demand for resources exceeds capability of the first set of resources provided under the first service level (e.g., during a high demand period), a scheduling controller may assign additional resources to the first entity in addition to the first set of resources specified by the first service level. In combination with the first set of resources, the additional resources are adequate to satisfy second defined levels of quality, availability, and reliability of the satellite communication service that are greater than the first defined levels of quality, availability, and reliability of the satellite communication service.

Implementations may include one or more of the following features. The additional resources may include one or more of: a different coverage area (e.g., a different shape of the coverage footprint and/or increased size of the coverage footprint that better supports communication capabilities of the first entity); an increased capacity for communication capabilities of the first entity; and an improved quality of service. For example, the increased capacity supported for communication may include one or more of: an increased bandwidth for the satellite communication service being provided to improve communication capabilities of the first entity; an increased number of users associated with the first entity that are capable of being supported for communication via the satellite communication service being provided; and an increased number of frequency bands or channels allocated for communication via the satellite communication service being provided.

In accordance with one aspect of the method, the additional resources may be provided by assigning additional resources from one or more satellites of the constellation of satellites to the first entity. The constellation may vary depending on the implementation can be part of the same constellation or a different constellation.

For example, in accordance with one implementation of the method, the first constellation of satellites is a constellation of commercial satellites, and the additional resources may be provided by deploying of one or more additional commercial satellites that are added as part of the constellation of commercial satellites. In such implementations, the additional resources may be provided by the one or more additional commercial satellites that are assigned to or dedicated to the first entity.

As another example, in accordance with another implementation of the method, the first constellation of satellites maybe a constellation of sovereign satellites that are associated with and assigned to the first entity. In some implementations, the additional resources may be provided by one or more commercial satellites that are part of a second constellation of commercial satellites, where the additional resources provided by the one or more commercial satellites are assigned to or dedicated to the first entity.

As another example, in accordance with another implementation of the method, the first constellation of satellites is a constellation of sovereign satellites dedicated to the first entity, and the additional resources may be provided by deploying of one or more additional sovereign satellites that are added as part of the sovereign constellation of sovereign satellites.

The service levels may be specified in a number of different ways depending on the implementation of the method. For instance, the first service level may be specified by one or more of: the percentage of time that the satellite communication services will be available and operational; a maximum data rate or throughput that can be achieved for the services, an acceptable packet loss during data transmission, a maximum allowable latency or signal propagation delay for communication between terminals and a satellite, maximum jitter values, etc. Various other variables or parameters could be used to specify service levels depending on the implementation.

The core network may determine whether the current demand for resources exceeds capability of the first set of resources (that are provided under the first service level) by one or any combination of methods depending on the implementation of the method.

For instance, in accordance with one implementation of the method, the core network may predict, based on the current demand for resources by the first entity, a future demand for resources by the first entity and determine whether the predicted demand for resources exceeds capability of the first set of resources provided under the first service level. In this sense, the future demand for resources is a "predicted demand" for resources.

In accordance with another implementation of the method, the core network may determine whether the current demand for resources exceeds capability of the first set of resources provided under the first service level by analyzing current network traffic in real-time or near real-time to identify increases in demand for satellite communication service.

In accordance with another implementation of the method, the core network may determine whether the current demand for resources exceeds capability of the first set of resources provided under the first service level by analyzing current network traffic patterns to predict future demand for resources and to identify increases in future demand for satellite communication service.

In accordance with another implementation of the method, the core network may determine whether the current demand for resources exceeds capability of the first set of resources provided under the first service level by analyzing utilization of satellite transponders to determine how much capacity is being used to identify trends to identify usage trends and adjusting resources accordingly.

In accordance with another implementation of the method, the core network may determine whether the current demand for resources exceeds capability of the first set of resources provided under the first service level by analyzing, via machine learning and/or predictive analytics, data to predict and identify patterns related to high-demand periods (and future demand) for the satellite communication service.

In accordance with another implementation of the method, the core network may determine whether the current demand for resources exceeds capability of the first set of resources provided under the first service level by processing a request from the first entity for additional resources to satisfy changing operational requirements to ensure that the satellite communication service meets operational needs of the first entity.

Other embodiments of this aspect include corresponding computer systems, apparatus, and computer programs recorded on one or more computer storage devices, each configured to perform the actions of the methods. For example, in one aspect, a system for rapid acquisition of additional resources for a satellite communications service is provided that includes at least one hardware-based processor and memory, wherein the memory comprises processor-executable instructions encoded on a non-transient processor-readable media, and the processor-executable instructions, when executed by the processor, configure the system to perform the method described herein. In another aspect, a non-transitory computer-readable medium is provided that stores a set of instructions for rapid acquisition of additional resources for a satellite communications service. The set of instructions comprise instructions that, when executed by one or more processors of a device, cause the device to perform the method described herein.

Further aspects, features, applications and advantages of the disclosed technology, as well as the structure and operation of various examples, are described in detail below with reference to the accompanying drawings. It is noted that the disclosed technology is not limited to the specific examples described herein. Such examples are presented herein for illustrative purposes only. Additional examples will be apparent to persons skilled in the relevant art(s) based on the teachings contained herein.

BRIEF DESCRIPTION OF THE SEVERAL VIEWS OF THE DRAWINGS

For a better understanding of the present disclosure, non-limiting and non-exhaustive examples of the present disclosure are described with reference to the following drawings, in which:

FIG. 3 is a simplified diagram that illustrates satellites of a satellite system that are orbiting the Earth as part of a constellation;

In the drawings, similar reference numerals refer to similar parts throughout the drawings unless otherwise specified. These drawings are not necessarily drawn to scale.

DETAILED DESCRIPTION

Figure 1:
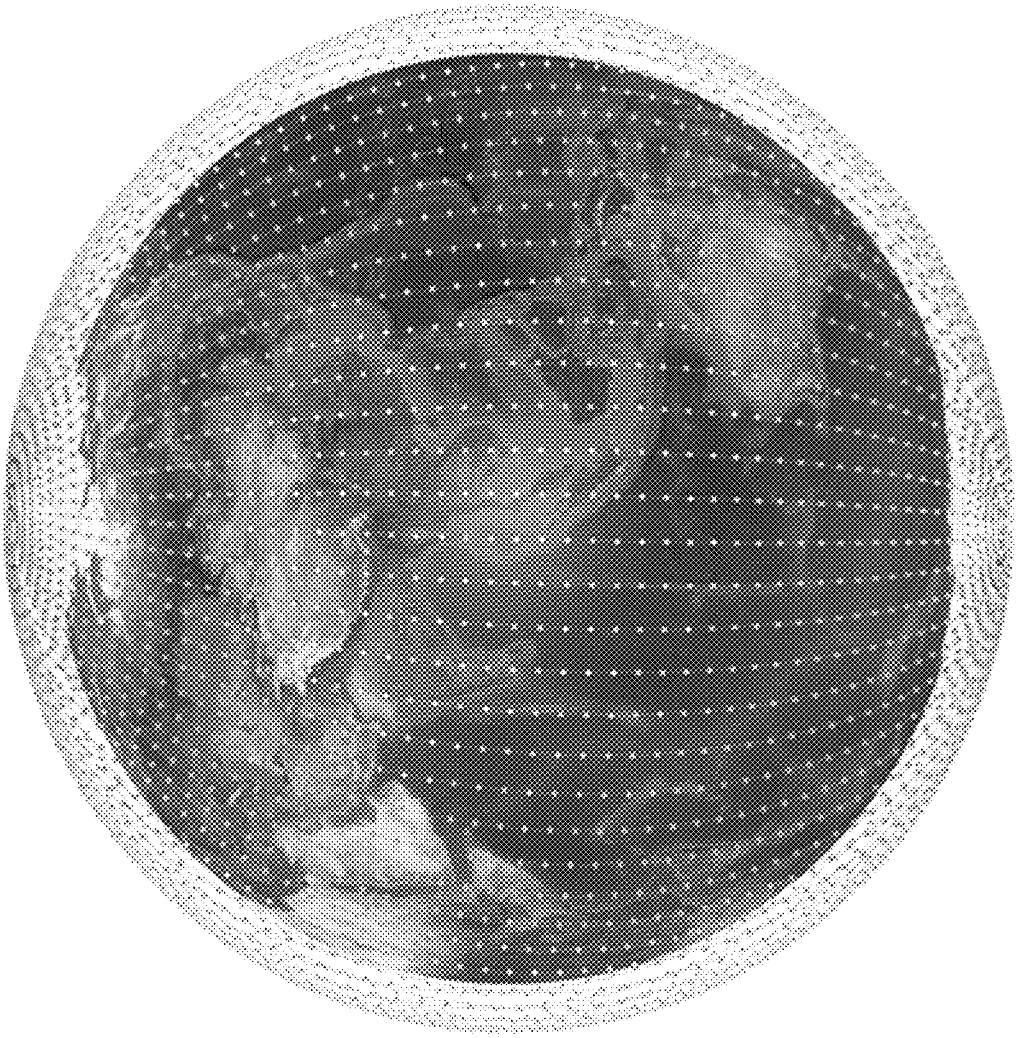
FIG. 1 is a diagram of a satellite system or constellation of satellites, where each dot represents a satellite that is in orbit around the Earth.

Technologies are provided for dynamically and securely reconfiguring a subset of satellites of a constellation of satellites. Technologies are also provided for rapid acquisition of additional resources for a satellite communications service that is provided to a first entity. The specification and accompanying drawings disclose one or more exemplary embodiments that incorporate the features of the present disclosure. The scope of the present disclosure is not limited to the disclosed embodiments. The disclosed embodiments merely exemplify the present disclosure, and modified versions of the disclosed embodiments are also encompassed by the present disclosure. Embodiments of the present disclosure are defined by the claims appended hereto. Prior to describing exemplary embodiments that incorporate the features of the present disclosure, a discussion of security concepts that are applicable to the exemplary embodiments will be provided.

Access Control

Access control refers to the ability to control access to a system or resources within a computer, computer network or computer system. An access control protocol is a set of rules and procedures used to regulate access to a computer, computer network or computer system. An access control protocol is designed to ensure that only authorized users are granted access to network resources, while unauthorized users are denied access. Access control protocols are often implemented as part of a larger security framework, and they can take many different forms. Some examples of access control protocols include password-based authentication, biometric authentication, firewalls, and encryption. The purpose of an access control protocol is to prevent unauthorized access to a computer, computer network or computer system, or sensitive information and resources of a computer, computer network or computer system. Access control protocols are an essential part of any secure computing environment.

Authentication

Authentication is the process of verifying the identity of a user, device, or system attempting to access a particular resource or service. It involves validating that the credentials provided by the user, device or other computer match the ones on file for the authorized user, device or other computer. Authentication is an important aspect of security and is often used in conjunction with authorization, which determines the level of access that the authenticated user or device has to a particular resource or service. One common authentication process typically involves the user providing a username and password. However, there are a number of other authentication processes or protocols, such as: Two-Factor Authentication (2FA); Public Key Infrastructure (PKI); Kerberos; biometric information (e.g., retina scans, voice recognition, and fingerprints); smart cards; security tokens; digital certificates, etc. Two-Factor Authentication (2FA) can refer to an authentication process that combines something the user knows (such as a password) with something they have (such as a phone) to verify their identity. Public Key Infrastructure (PKI) can refer to an authentication process that uses public key encryption to secure communication and authenticate parties. These authentication processes or protocols can be used alone or in combination to provide multiple layers of security for authentication. The choice of authentication method depends on the security requirements and the level of protection needed for a particular system or application.

Authentication can take place at various stages of accessing a resource or service, such as at login, during a transaction, or when accessing a secure resource within a system. It is often used to control access to sensitive information or resources, to prevent unauthorized access or misuse, and to ensure the privacy and security of data. Authentication does not determine what tasks the individual/entity can do or what files the individual/entity can see. Authentication merely identifies and verifies who the person, entity or system is.

Authorization

Authorization is the process of determining whether an authenticated user, device, or system has the appropriate permissions and privileges to access a particular resource, use the resource or perform a specific action. Authorization is usually coupled with authentication so that the server has some concept of who the client is that is requesting access. Once a user, device, or system has been authenticated through the process of verifying their identity, authorization determines what actions they are allowed to take within a system or application. It involves checking the permissions and privileges assigned to the user, device, or system and comparing them to the requirements of the requested resource or action. Authorization can be based on a variety of factors, including the user's role, the level of clearance they have been granted, or other criteria such as time of day, location, or device type. Access can be granted or denied based on these criteria. Authorization is an important part of security as it ensures that only authorized users, devices, or systems are able to access sensitive data and resources. Proper authorization helps prevent unauthorized access, and ensures that users are able to access the resources they need while maintaining the security and integrity of the system.

Encryption

Data encryption is the process of converting plain text into a coded format called cipher text, which can only be read or understood by someone who has the right decryption key or algorithm. Encryption uses mathematical algorithms to scramble the data in a way that makes it unreadable to anyone who does not have the key to unscramble it.

An encryption process typically involves the following steps: the data is converted into binary form (i.e., a sequence of 0s and 1s); and an encryption algorithm takes this binary data and manipulates it in some way (e.g., using a combination of mathematical operations, such as substitution and permutation) to produce a new sequence of binary digits (called cipher text), which is meaningless and unreadable without the key. To decrypt the data, the recipient must use the same encryption algorithm and the correct decryption key to reverse the process and convert the cipher text back into plain text. There are two types of keys that are used in encryption and decryption: symmetric keys and asymmetric keys. There are also many different encryption algorithms, and they vary in terms of their complexity, security, and speed. Some commonly used encryption algorithms include AES (Advanced Encryption Standard), RSA (Rivest-Shamir-Adleman), and DES (Data Encryption Standard). Some examples of encryption algorithms that use symmetric keys include AES, DES, and Blowfish. Examples of encryption algorithms that use asymmetric keys include RSA, Diffie-Hellman, and Elliptic Curve Cryptography (ECC).

Symmetric key encryption (also known as shared secret encryption) uses the same key for both encryption and decryption. This means that both the sender and the recipient need to have access to the same key. The key is used to scramble the data into cipher text, and the same key is used to unscramble the cipher text back into plain text. The strength of symmetric key encryption depends on the length of the key and the complexity of the algorithm used to encrypt the data.

Asymmetric key encryption (also known as public key encryption) uses a pair of keys: a public key and a private key. The public key is widely distributed and can be used by anyone to encrypt data, while the private key is kept secret and is used to decrypt the data. This means that anyone can send encrypted messages to the recipient using their public key, but only the recipient with the corresponding private key can decrypt the messages. Asymmetric key encryption is more secure than symmetric key encryption, but it is also slower and more computationally intensive.

Having given this description of security techniques that can be applied within the context of the present disclosure, technologies will now be described for dynamically and securely reconfiguring a subset of satellites of a constellation of satellites with reference to FIGS. 1-7.

FIG. 1 is a diagram of a satellite system 100 or constellation 100 of satellites, where each dot represents a satellite that is in orbit around the Earth. The constellation includes a group of artificial satellites that are positioned in number of different orbits around the Earth to provide specific services or coverage. For instance, the satellites can work together to offer communication, navigation, or remote sensing services to a wide geographic area on Earth. The constellation can include any number of satellites required to ensure global coverage and to provide redundancy in case of failure. It should be appreciated that such satellite constellations can be arranged in different configurations, including low Earth orbit (LEO), medium Earth orbit (MEO), or geostationary orbit (GEO), depending on the intended application and the desired level of coverage and service.

Figure 2A:
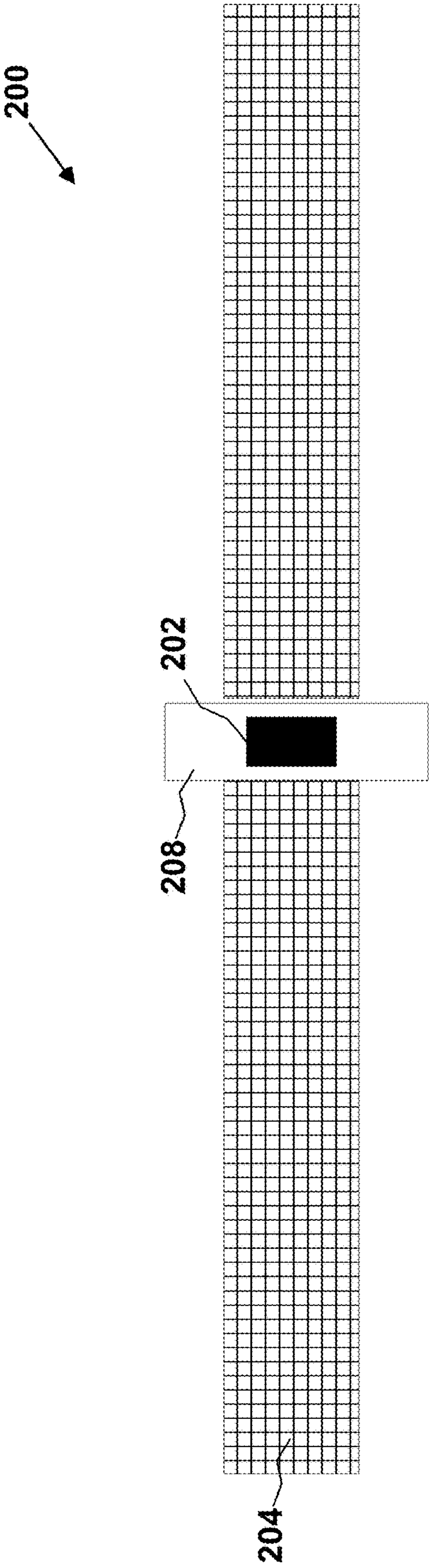
FIGS. 2A and 2B are diagram illustrating a top and front views of one non-limiting example of satellite in which aspects of the technology may be practiced.
Figure 2B:
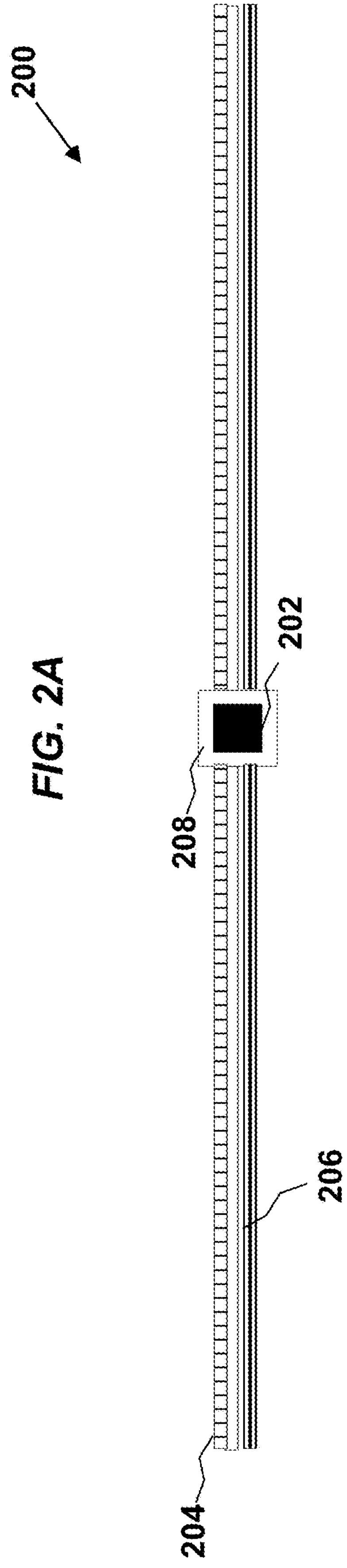
Figure 2C:
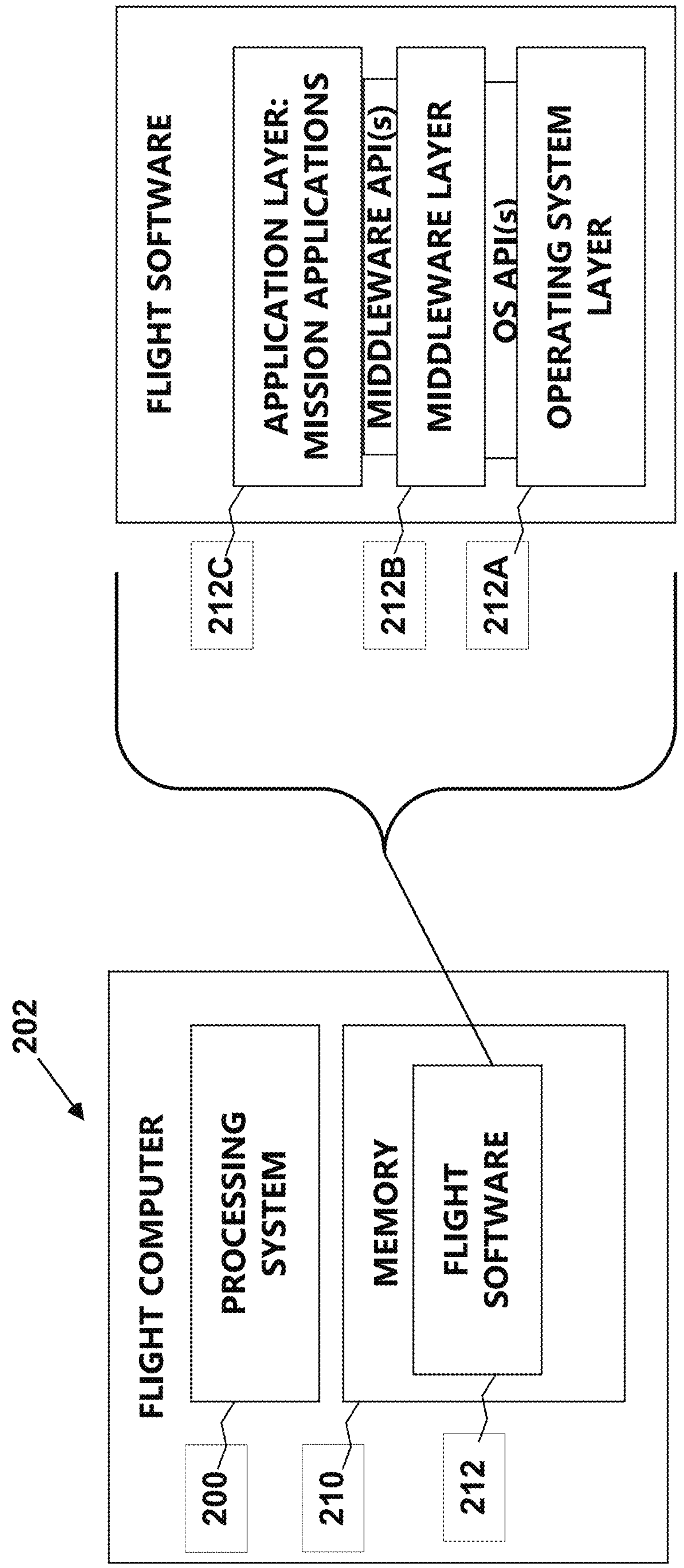
FIG. 2C is a block diagram illustrating one non-limiting example of a flight computer of a satellite in which aspects of the technology may be practiced.

FIGS. 2A and 2B are diagram illustrating a top and front views of one non-limiting example of satellite 200 in which aspects of the technology may be practiced. FIG. 2C is a block diagram illustrating one non-limiting example of a flight computer 202 of satellite 200 in which aspects of the technology may be practiced. The flight computer 202 can refer to a computer that is on board a satellite and is sometimes referred to as a command and data handling (CDH) subsystem. The flight computer 202 is responsible for making the major decisions on the satellite. For example, flight computer 202 communicates with other subsystems on board to keep track of the processes going on in the satellite. The flight computer 202 is the link to peripheral hardware and acts as the central entity for sending commands and collecting all housekeeping information. The flight computer 202 may collect data from other subsystems, read the data coming in from the various sensors, process this data and take any required actions. The flight computer 202 may also have an operating system installed that can manage the various programs.

In the embodiment illustrated in FIG. 2C, the flight computer 202 includes a processing system 200, and memory 210 that stores code that is executable by the processing system 200. The code stored in memory 210 includes code to implement various features of flight software 212, which may also be referred to as flight control software. Flight software 212 is operated flight computer 202 to serve as the "brain" of the satellite. For example, flight software 212 may run on a processor embedded in a satellite's avionics. The name "flight software" reflects the location where it executes, i.e. in the satellite, to differentiate from "ground software", which runs in the ground segment. Flight software 212 enables the satellite to perform all operations necessary to facilitate the science objective and perform maintenance tasks for the satellite. For instance, flight software 212 is responsible for managing on-board activities, data processing and satellite health and safety. It is considered a high-risk system because it interacts directly with satellite hardware, controlling virtually most of the onboard systems in real time at various levels of automation.

The flight software 212 can vary depending on the implementation. In general, flight software 212 may include an operating system (OS) layer 212A that interfaces with a middleware layer 212B via OS application programming interfaces (APIs), and an application layer 212C that interfaces with the middleware layer 212B via middleware application programming interfaces (APIs). The OS APIs may be encapsulated and a uniform Application Program Interface (API) may be provided by the OS layer 212A. Any operating system that supports this uniform API can be used in the avionics system. The middleware layer 212B serves as common service platform between the operating system layer 212A and application layer 212C. The middleware layer 212B has standard program interfaces and protocols, and can realize the data exchange and cross support among different hardware and operating system. The application layer 212C includes any mission application software or "mission applications." The application layer 212C includes most of the common functions of avionics system. The implementation of this layer may be different for different projects.

FIG. 3 is a simplified diagram that illustrates satellites 302, 304, 306, 308 of a satellite system 300 that are orbiting the Earth as part of a constellation. Satellites 302, 304, 306, 308 can be part of a constellation of satellites that may include any number of satellites. A constellation of satellites may include any number of orbits (where each orbit is illustrated by an arrow) with any number of satellites in each orbit. For sake of illustration, in the example depicted, it can be assumed that the constellation of satellites that may include four orbits (as indicated by arrows) with a number A-n satellites in each of the four orbits.

In this example, for sake of discussion it is assumed that access privileges for one subset of satellites 302, 304 are initially assigned to a first entity 310 such that usage of the subset of satellites 302, 304 is initially controlled exclusively by the first entity 310. Likewise, also for sake of discussion, it is assumed that access privileges for the subset of satellites 306, 308 are assigned to a second entity 320 such that usage of the subset of satellites 306, 308 is controlled exclusively by the second entity 320. As used herein, the term "entity" can refer to a user or a group of users (e.g., an organization, a country, a state, etc.), a system or group of systems including computer networks.

For whatever reason, the second entity 320 needs to acquire privileges to use and/or control additional satellites of the constellation, and for purposes of discussion, it can be assumed that the second entity 320 seeks to acquire privileges to use satellites 304 of the constellation that are currently assigned to the first entity 310. For instance, the second entity 320 may seek to acquire privileges to use additional satellites of the constellation to acquire additional capacity or bandwidth as two non-limiting examples. For purposes of discussion, it is assumed that the second entity 320 seeks to acquire privileges to use satellites 304 of the constellation that are currently assigned to the first entity 310. In this situation, it is desirable to provide a secure way for transferring control over the satellites 304 from the first entity 310 to the second entity 320.

Figure 4A:
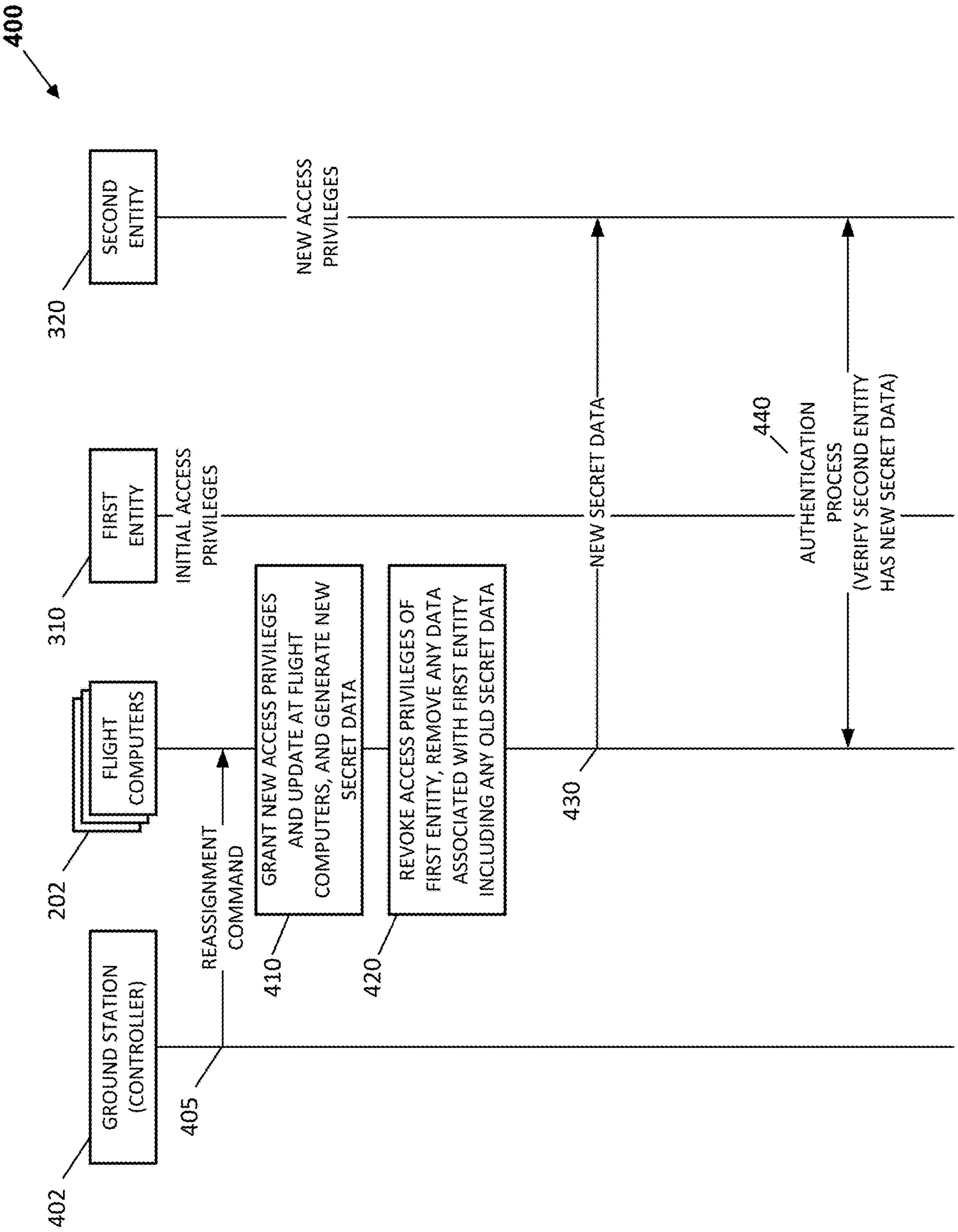
FIGS. 4A and 4B are collectively a flow diagram illustrating one example of a method for dynamically and securely reconfiguring a subset of satellites of a constellation of satellites according to aspects of the disclosed technology.
Figure 4B:
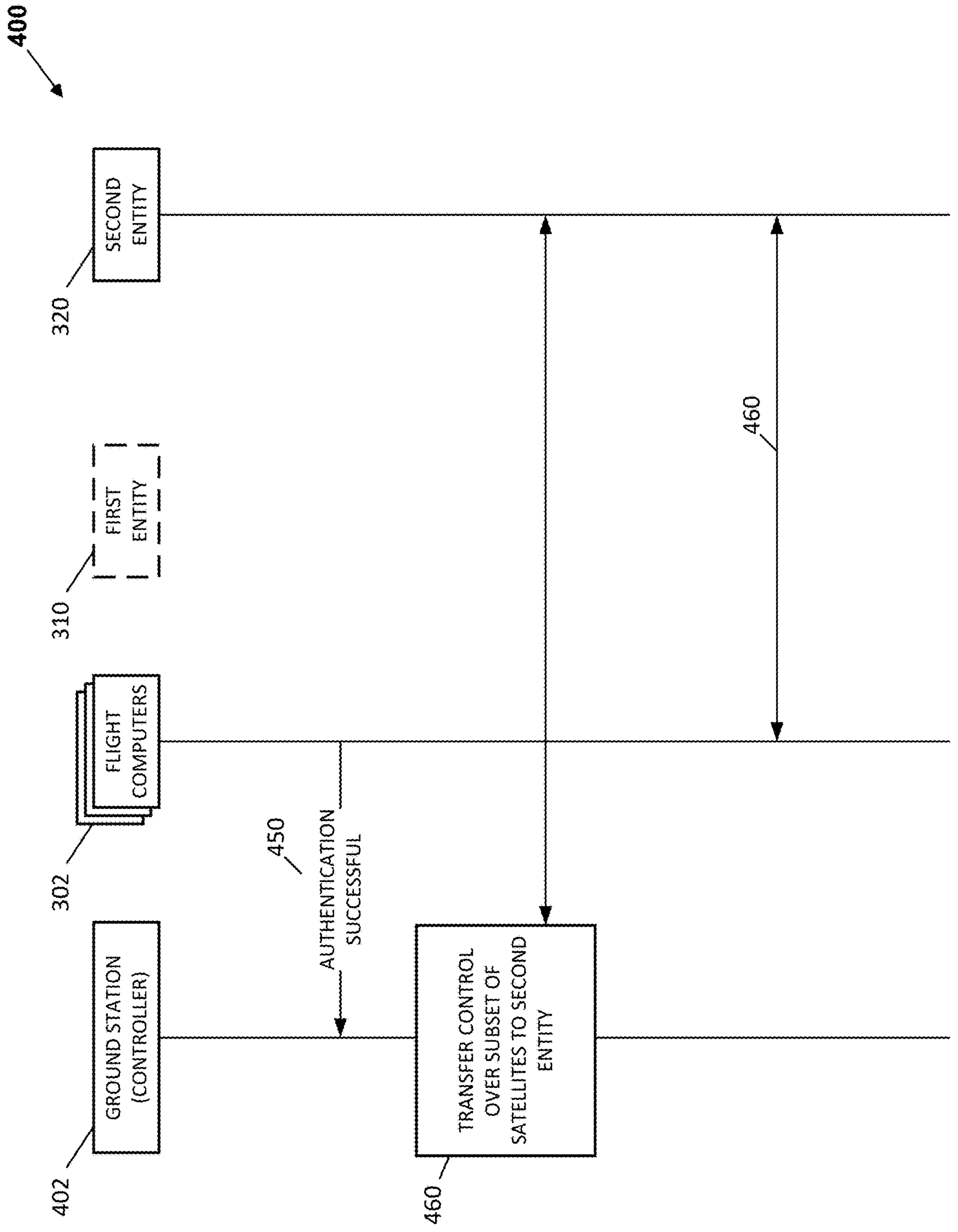

FIGS. 4A and 4B are collectively a flow diagram illustrating one example of a method 400 for dynamically and securely reconfiguring a subset of satellites of a constellation of satellites according to aspects of the disclosed technology. For illustrative purposes, the following description of each method may refer to elements mentioned above in connection with FIGS. 1-3C. As used herein, the subset of satellites refers to one or more of the satellites that make up the constellation 100, but less than all of the satellites that make up the constellation 100.

Initial access privileges to the subset of satellites are initially assigned to a first entity 310 such that usage of the subset of satellites is initially controlled by a first entity 310. As will not be described below, in managing access control within such a system, the process of revoking access privileges from one entity and granting them to another may be desirable in some cases. To revoke access privileges from one entity and grant them to another, once the entities have been identified and the scope of the access privileges to revoked or granted has been determined, each entities permissions and/or authentication credentials can be changed. For example, some or all of an entity's permissions can be removed or their authentication credentials may be revoked. Conversely, for an entity to whom access privileges are to be granted, authentication credentials could be provided, in addition to granting/assigning access privileges to the entity.

At 405, an instruction (also referred to herein as a "reassignment command" herein) is communicated from a controller 402 to a respective flight computer 202 at each of the subset of satellites. The instruction indicates that the subset of satellites are to be reassigned to a second entity 320. Upon being received at each satellite that is part of the subset of satellites to be reassigned, the instruction can then be processed at each flight computer 202 to grant (at 410) new access privileges to the second entity 320 and to revoke (at 420) the access privileges from the first entity 310.

At 410, in response to the instruction, each flight computer 202 grants new access privileges to the second entity 320 and updates the existing access privileges for that flight computer. As part of the processing at 410, each flight computer 202 may create new authentication credentials associated with the second entity 320 that are shared with only the second entity 320. In some embodiments, at 410, each flight computer 202 can, for example, assign new permissions associated with the second entity 320. The new authentication credentials associated with the second entity 320 can include, but are not limited to, new secret data required to authenticate with each flight computer 202. As used herein, "secret data" can be any shared secret including but not limited to one or more of: a secret object, such as a password, passcode, token, key, etc. Any of these examples of secret data can be encrypted to provide another level of security.

As will be explained below, as part of an authentication process at 440, and because only the second entity 320 has the new secret data, the first entity 310 will no longer able to authenticate with that flight computer 202 once the new authentication credentials (including the new secret data) are created as the prior authentication credentials of the first entity 310 will no longer be valid.

At 420, in response to the instruction, each flight computer 202 revokes the access privileges that existed for and were associated with the first entity 310. As will be explained in greater detail below with reference to the various embodiments, revoking the initial access privileges of the first entity 310 can thus prevent the first entity 310 from accessing, controlling or using the subset of satellites. In some embodiments, at 420, each flight computer 202 can, for example, remove permissions associated with the first entity 310.

While 410 and 420 are shown as separate blocks for purposes of illustration, it should be appreciated that certain steps of this processing can be performed in a single step. For example, as part of the process of creating new authentication credentials associated with the second entity 320 (at 410) and revoking the authentication credentials (at 420) associated with the first entity 310, each flight computer 202 can generate new secret data for the second entity 320 and update (e.g., overwrite or replace) the "initial" or "prior" secret data for the first entity 310 (that previously existed) with the new secret data for the second entity 320.

In one embodiment, as part of the process of creating new authentication credentials associated with the second entity 320 (at 410) and revoking the authentication credentials (at 420) associated with the first entity 310, each flight computer 202 can create or update an access control list (ACL), or a list of rules that specify which entities are granted or denied access to the subset of satellites. The flight computers 302 can then use the ACL to determine whether to grant or deny access to the subset of satellites. As used herein, an access control list (ACL) can refer to a list of rules that specify which entities are granted or denied access to the subset of satellites (or resources thereof). The access control lists can also be used for controlling permissions to access the subset of satellites, and to filter traffic in and out of each of the flight computers 302 of the subset of satellites such that they act as network gateways or endpoint devices in a sense.

In one embodiment, as part of the process of creating new authentication credentials associated with the second entity 320 (at 410) and revoking the authentication credentials (at 420) associated with the first entity 310, each flight computer 202 can create a new root level password for the second entity 320 and/or disable an old root level password for the first entity 310. The root level password can refer to the password having the highest level of access control.

In one non-limiting embodiment, each flight computer 202 can generate the new secret data (at 410), for example, by receiving a code sent from the entity and then use information in that code to create the new secret data. For instance, in one implementation, each flight computer 202 can generate the new secret data by receiving a random value from the entity and then applying that random value to an encryption algorithm to create the new secret data. In some implementations, the encryption algorithm used to generate the new secret data is not known to the first entity 310, and therefore, even if the first entity 310 has access to the random value, the first entity 310 is unable to recreate the new secret data.

In some embodiments, the secret data generated by the flight computers 202 is encrypted using different encryption processes for each entity. In one implementation, each instance of control software (at the flight computers 202) requires that any new secret data is encrypted using a different encryption process than the encryption process used to generate secret data for other entities so that the encryption process used to encrypt the new secret data is not known to prior entities (e.g., so that the encryption process used to generate the new secret data for the second entity 320 is not known by the first entity 310). For example, the secret data for the first entity 310 may be encrypted using a first encryption process, whereas the new secret data for the second entity 320 may be encrypted using a second encryption process that is different than the first encryption process.

Referring again to 420, it should be noted that, prior to transferring control of any flight computer 202 to the second entity 320 (e.g., when verification of the new secret data is successful at authentication process 440), all data associated with the first entity 310 is removed (e.g., erased) from that flight computer 202 at 420. This way, the second entity 320 will not have access to any data belonging to the first entity 310.

At 430, the new secret data (generated at 410) can be provided to the second entity 320. In the example shown in FIG. 4A, the new secret data is shown as being communicated from one or more the flight computers 202 to the second entity 320, but it should be appreciated that this is for illustration purposes only and that how the new secret data is communicated to the second entity 320 can vary depending on the implementation. The new secret data is communicated to the second entity 320 using any known communication technology either directly or indirectly, using an in-band or out-of-band protocol. For example, the new secret data could be communicated to the second entity 320 from the controller 402 or another entity. Additionally, it should be noted that in some embodiments, the new secret data may be encrypted further before being provided to the second entity 320 to provide an additional layer of security.

After the new secret data is sent to second entity 320, the second entity 320 can authenticate with any of the flight computers 202 of the of the subset of satellites by participating in an authentication process 440 with one or more of the flight computers 202. The authentication process 440 used to authenticate the second entity 320 at each flight computer 202 can vary depending on the implementation. Regardless of the implementation, as part of the authentication process 440, any flight computer 202 that receives an authentication attempt from the second entity 320 can verify it to confirm that the second entity 320 does in fact have the new secret data. For example, in some embodiments, the second entity 320 can then be authenticated at each flight computer 202 by verifying the new secret data, and when verification of the new secret data is successful, control (e.g., access and usage) of that flight computer 202 can be transferred to the second entity 320.

Referring now to FIG. 4B, when the authentication process 440 is successful (e.g., verification of the new secret data is successful), at 450, the flight computer(s) 302 may notify the controller 402. At 460, the controller 402 transfers control of the subset of satellites to the second entity 320, and access and usage of the subset of satellites is then controlled by the second entity 320. The second entity 320 can then access, communicate and interact with any of the of the subset of satellites.

Figure 5:
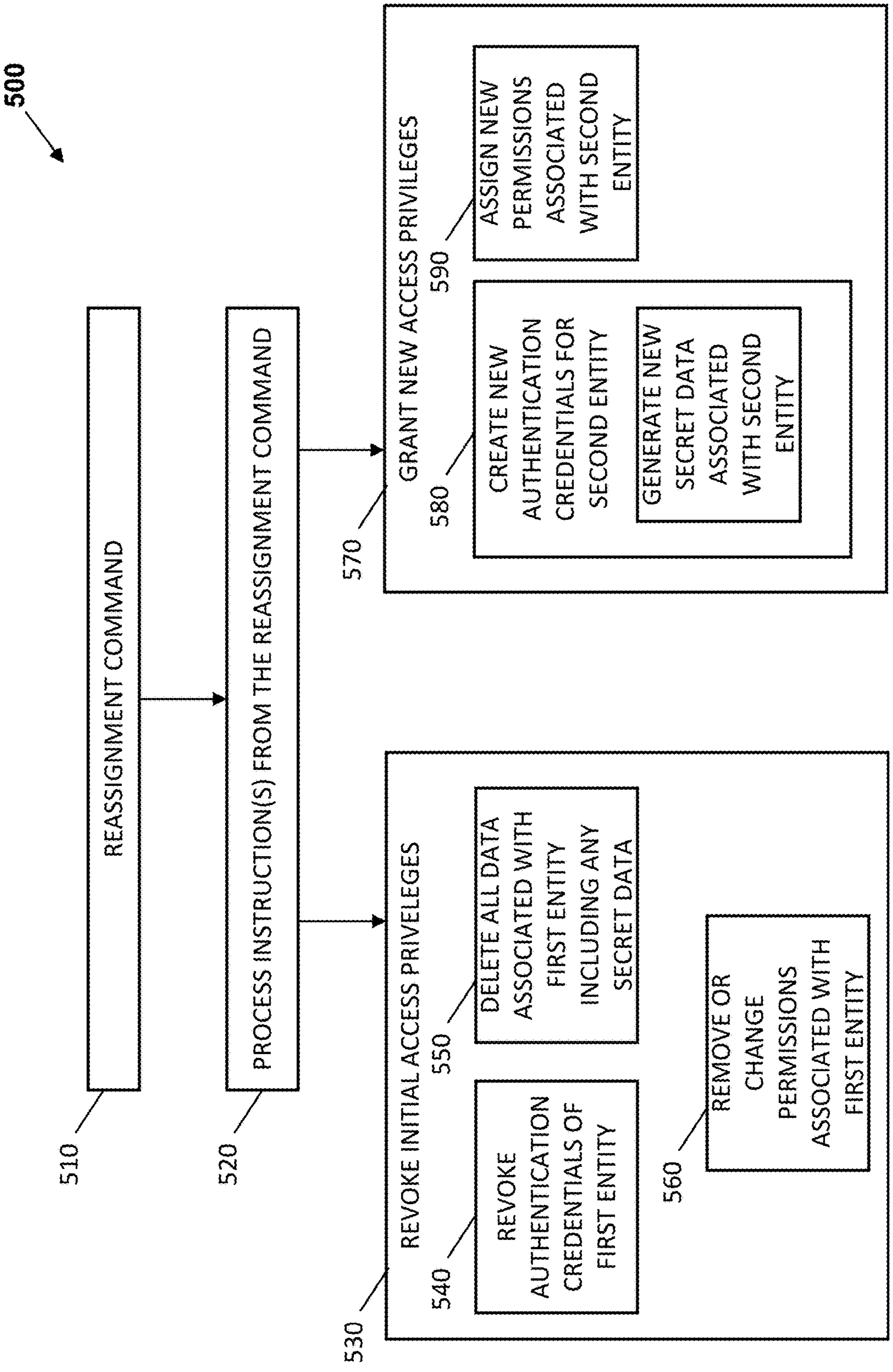
FIG. 5 is a flowchart illustrating one example of a method for changing access privileges for a subset of satellites of a constellation of satellites according to aspects of the disclosed technology.
Figure 6:
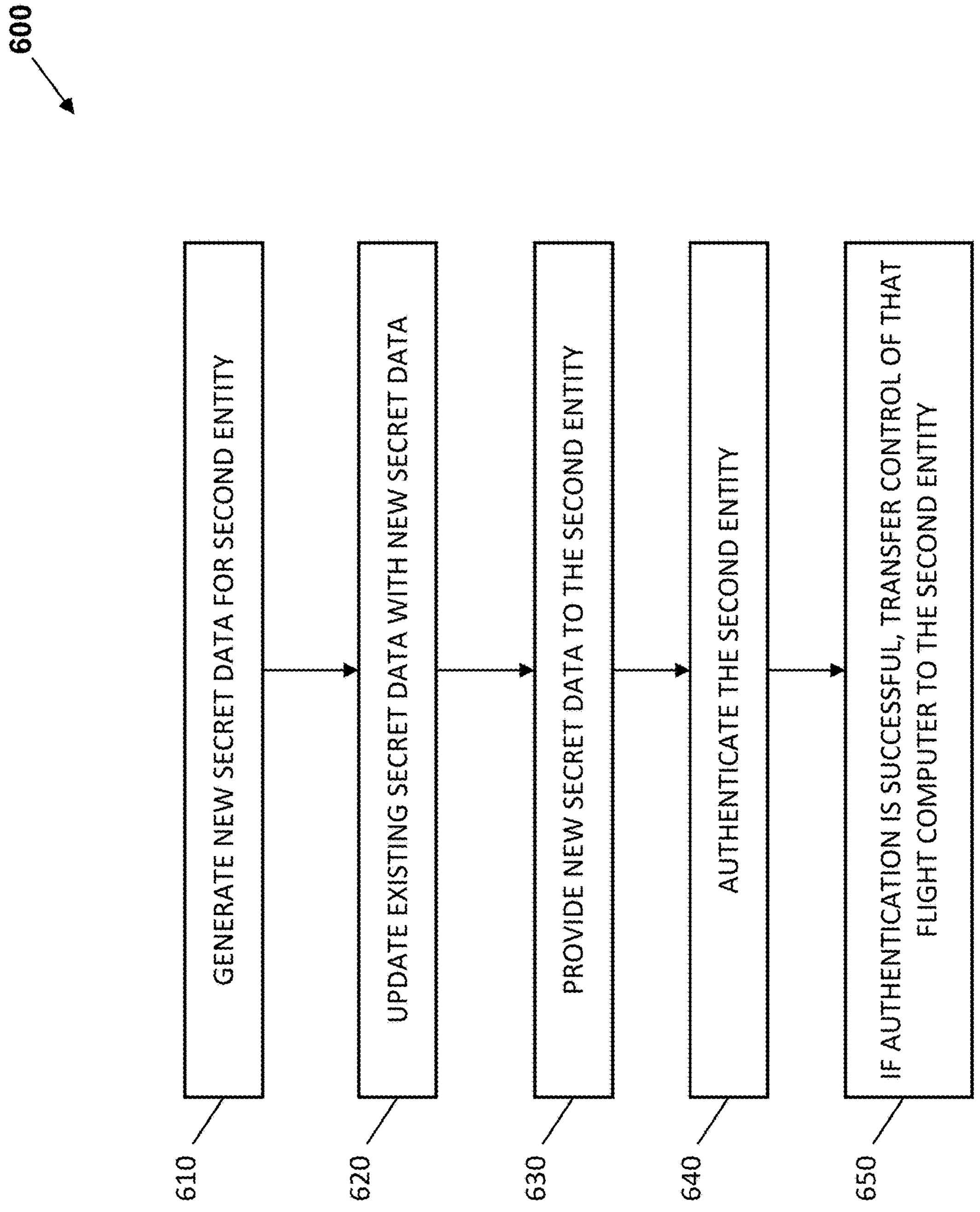
FIG. 6 is a flowchart illustrating one example of a method for transferring control of a subset of satellites of a constellation of satellites from the first entity to the second entity according to aspects of the disclosed technology.
Figure 7:
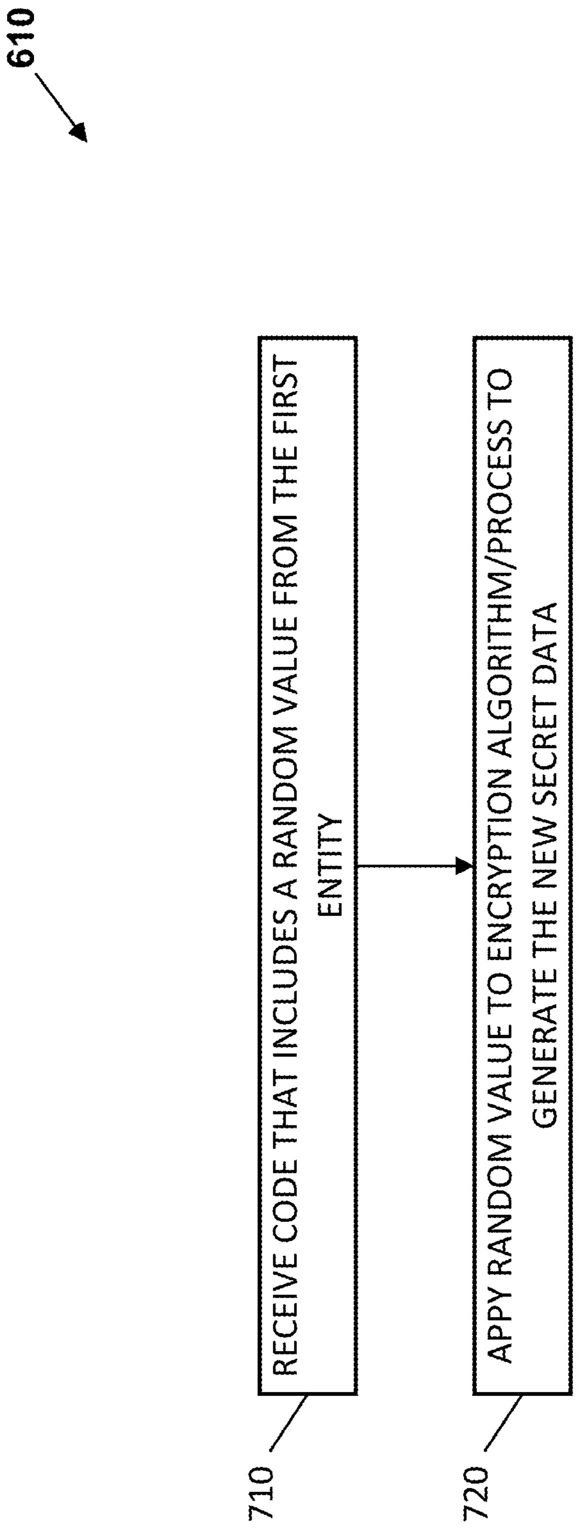
FIG. 7 is a flowchart illustrating one example of a method for generating secret data that is used by an entity to authenticate with a subset of satellites of a constellation of satellites after access privileges have been transferred to that entity according to aspects of the disclosed technology.

FIGS. 5-7 are flow charts that illustrate examples of methodologies that can be used as part of a broader methodology for dynamically and securely reconfiguring satellites that are part of a constellation of satellites in accordance with the disclosed embodiments. With respect to FIGS. 5-7, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIGS. 1-4B. In certain embodiments, some or all steps of this process, and/or substantially equivalent steps, are performed by execution of processor-readable instructions stored or included on a processor-readable medium. For instance, in the description of FIGS. 5-7 that follows, the flight computers 302 and controller 402 can be described as performing various acts, tasks or steps, but it should be appreciated that this refers to processing system(s) of these entities executing instructions to perform those various acts, tasks or steps.

FIG. 5 is a flowchart illustrating one example of a method for changing access privileges for a subset of satellites of a constellation of satellites according to aspects of the disclosed technology. At 510, a reassignment command is communicated from a controller 402 to a respective flight computer 202 at each of the subset of satellites. The instruction indicates that a subset of satellites (of a constellation of satellites) are to be reassigned to the second entity 320. Upon being received at each satellite that is part of the subset of satellites to be reassigned, the reassignment command can then be processed at each flight computer 202 at 520. As a result of processing the reassignment command, each flight computer can revoke (at 530) the access privileges from the first entity 310, and/or grant (at 570) new access privileges to the second entity 320. The access privileges allow an entity to have access to the subset of satellites and/or to control usage of the subset of satellites so long as the access privileges are valid at those particular satellites.

At 530, in response to the reassignment command, each flight computer 202 may revoke any access privileges that existed for and were associated with the first entity 310. As explained above, revoking the access privileges of the first entity 310 prevents the first entity 310 from accessing, controlling or using the subset of satellites. The process of revoking access privileges of the first entity 310 can include any combination of sub-processes 540, 550, 560. At 540, each flight computer 202 can revoke authentication credentials of the first entity 310. At 550, each flight computer 202 can delete, overwrite or replace all data associated with the first entity 310 including any secret data associated with the first entity 310. This way, prior to transferring access or control of any flight computer 202 to another entity (e.g., the second entity 320), all data associated with the first entity 310 is removed (e.g., erased) from that flight computer 202 so that another entity (e.g., the second entity 320) will not have access to any data belonging to the first entity 310. In some embodiments, at 560, each flight computer 202 can change or remove permissions associated with the first entity 310.

At 570, in response to the reassignment command, each flight computer 202 may grant new access privileges to the second entity 320 and update the existing access privileges for that flight computer. The process of granting new access privileges to the second entity 320 can include any combination of sub-processes 580, 590. For example, at 580, each flight computer 202 may create new authentication credentials for or "associated with" the second entity 320 that are shared with only the second entity 320. As part of the process of creating new authentication credentials associated with the second entity 320 (at 580), each flight computer 202 can generate new secret data for the second entity 320. As such, the new authentication credentials associated with the second entity 320 may include new secret data required to authenticate with each flight computer 202. It should be noted that once the new authentication credentials (including the new secret data) are created, other entities, such as the first entity 310, will no longer able to authenticate with the flight computers 202 as their prior authentication credentials will no longer be valid. That is unless, of course, the second entity 320 shares the new authentication credentials with the other entities. In some embodiments, at 590, each flight computer 202 may also assign new permissions associated with the second entity 320.

FIG. 6 is a flowchart illustrating one example of a method 600 for transferring control of a subset of satellites of a constellation of satellites from the first entity 310 to the second entity 320 according to aspects of the disclosed technology.

At 610, each flight computer 202 can generate new secret data for the second entity 320. Additionally, it should be noted that in some embodiments, after being generated, the new secret data may be encrypted further before being provided to the second entity 320 to provide an additional layer of security. At 620, each flight computer 202 can update (e.g., overwrite or replace) any "prior" secret data (that previously existed for another entity, such as, the first entity 310) with the new secret data that was generated for the second entity 320. At 630, the new secret data (generated at 610) can be provided to the second entity 320. It should be noted that because the second entity 320 is the only entity that has the new secret data, other entities, such as the first entity 310, will no longer able to authenticate with the flight computers 202 once the new secret data is created because any prior secret data associated with another entity (e.g., first entity 310) will no longer be valid. That is unless, of course, the second entity 320 shares the new secret data with the other entities.

After the new secret data is sent to second entity 320, at 640, the second entity 320 can authenticate with any of the flight computers 202 of the of the subset of satellites by participating in an authentication process with one or more of the flight computers 202. The authentication process used to authenticate the second entity 320 at each flight computer 202 can vary depending on the implementation. Regardless of the implementation, as part of the authentication process, any flight computer 202 that receives an authentication attempt from the second entity 320 can verify it to confirm that the second entity 320 does in fact have the new secret data. For example, in some embodiments, the second entity 320 can then be authenticated at each flight computer 202 by verifying the new secret data, and when verification of the new secret data is successful, control (e.g., access and usage) of that flight computer 202 can be transferred to the second entity 320.

When the authentication process (at 640) is successful (e.g., verification of the new secret data is successful), at 650, the flight computer(s) 302 may notify the controller 402 and the controller 402 transfers control of the subset of satellites to the second entity 320 so that access to and usage of the subset of satellites is then controlled by the second entity 320. The second entity 320 can then access, communicate and interact with any of the of the subset of satellites.

As an additional security measure, in some embodiments, each flight computer 202 executes control software that is configured to accept the secret data from a particular entity (e.g., the first entity 310 or the second entity 320) only a single time. For example, control software executed at each flight computer 202 is configured to accept the new secret data from the second entity 320 only a single time, and during any subsequent authentication process (i.e., that occurs after authentication was successful at 640 and control was transferred at 650) different secret data will be needed in order for an entity to successfully authenticate with the flight computers 302.

FIG. 7 is a flowchart illustrating one example of a method 700 for generating secret data that is used by an entity to authenticate with a subset of satellites of a constellation of satellites after access privileges have been transferred to that entity according to aspects of the disclosed technology.

At 710, each flight computer 202 can generate the new secret data, for example, by receiving a code sent from the entity and then use information in that code to create the new secret data. For instance, in one implementation, each flight computer 202 can generate the new secret data by receiving a random value (e.g., string of random bits that is used to add randomness and unpredictability to the encryption process) from the entity and then applying that random value, at 720, to an encryption algorithm to create the new secret data. The random value may be used as the starting point for generating a key used in an encryption algorithm. The random value may also be referred to as a seed or initialization vector (IV). In some implementations, the encryption algorithm used to generate the new secret data is not known to the first entity 310, and therefore, even if the first entity 310 has access to the random value, the first entity 310 is unable to recreate the new secret data.

The random value helps ensure that the same plaintext input does not result in the same ciphertext output every time. Without a random value, an attacker could potentially discover the encryption key by analyzing patterns in the ciphertext output. By using a random value, the encryption algorithm becomes much more difficult to predict and to crack. The random value is typically used in combination with a cryptographic algorithm to generate an encryption key. For example, in AES (Advanced Encryption Standard) encryption, the random value is used to initialize the key schedule, which is a set of sub-keys used to encrypt and decrypt data. In some embodiments, the random value can be combined with other data to produce a unique encryption key for each message that is encrypted. The use of a random value helps to enhance the security and unpredictability of the encryption system, making it more difficult for an attacker to break the encryption and access the original plaintext data.

In some embodiments, the secret data generated by the flight computers 202 is encrypted using different encryption processes for each entity. In one implementation, each instance of control software (at the flight computers 202) requires that any new secret data is encrypted using a different encryption process than the encryption process used to generate secret data for other entities so that the encryption process used to encrypt the new secret data is not known to prior entities (e.g., so that the encryption process used to generate the new secret data for the second entity 320 is not known by the first entity 310). For example, the secret data for the first entity 310 may be encrypted using a first encryption process, whereas the new secret data for the second entity 320 may be encrypted using a second encryption process that is different than the first encryption process.

Scalability: Surge Capability of the Constellation(s)

Technologies will now be described for dynamically and securely reconfiguring a subset of satellites of a constellation of satellites with reference to FIGS. 8-10. The disclosed embodiments can allow for scalability to enable an entity to increase or decrease resources and service levels allocated to that entity based on changing operational requirements to ensure that the narrowband satellite communication service meets their operational needs.

Figure 8:
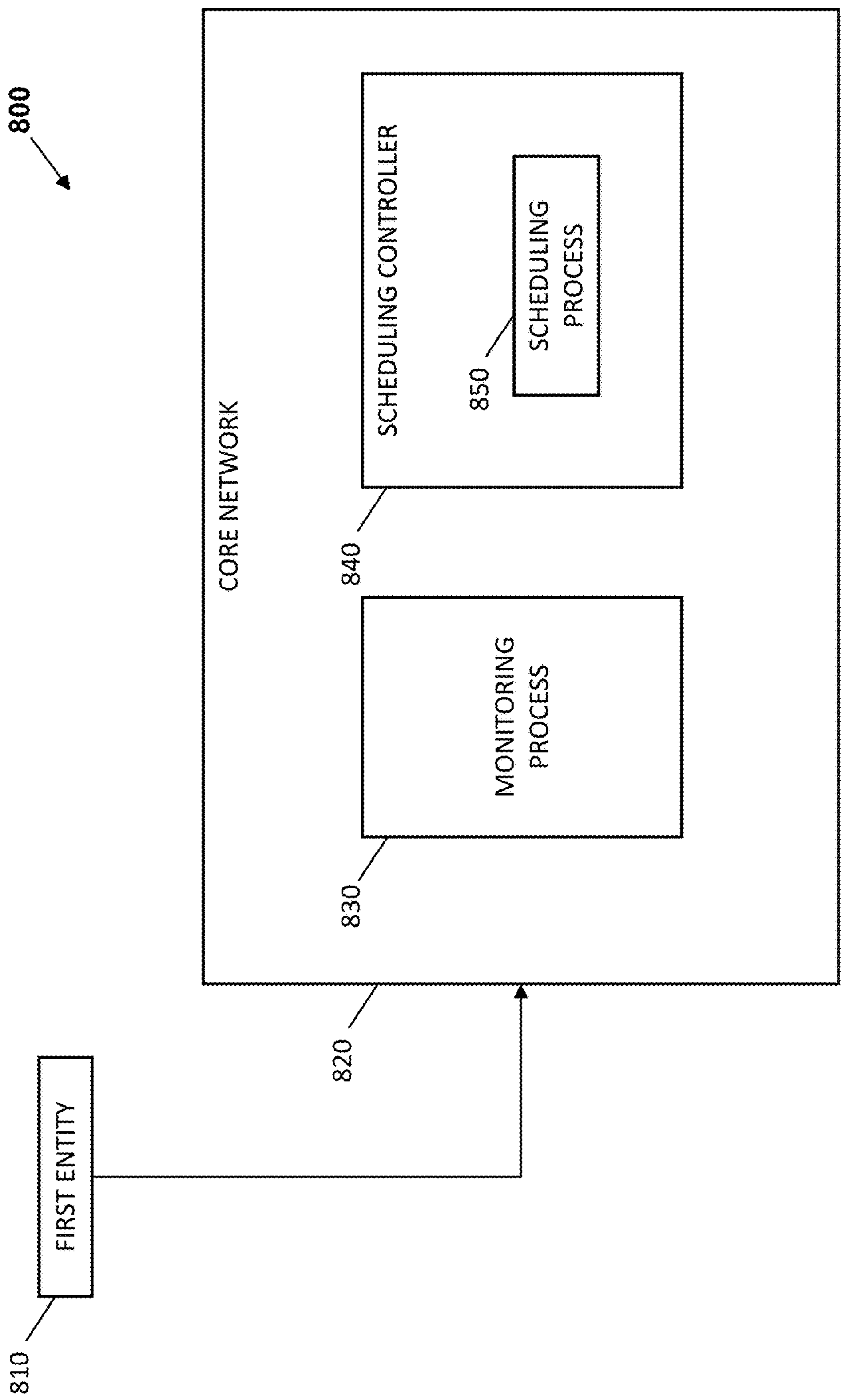
FIG. 8 is a diagram illustrating one example of computing device in which aspects of the technology may be practiced.

FIG. 8 is a diagram illustrating one example of a system 800 in which aspects of the technology may be practiced. A system 800 of one or more computers can be configured to perform particular operations or actions by virtue of having software, firmware, hardware, or a combination of them installed on the system 800 that in operation causes or cause the system 800 to perform the actions. One or more computer programs can be configured to perform particular operations or actions by virtue of including instructions that, when executed by data processing apparatus, cause the apparatus to perform the actions. Implementations of the described techniques may include hardware, a method (FIG. 9 at 900) or process, or a computer tangible medium. FIG. 9 is a flowchart illustrating one example of a method for rapid acquisition of additional resources for a satellite communications service that is provided to an entity, which may be referred to below as a first entity for sake of discussion according to aspects of the disclosed technology. FIG. 8 will be described in conjunction with FIG. 9.

A method (FIG. 9 at 900) is provided for rapid acquisition of additional resources for a satellite communications service that is provided to an entity, which may be referred to below as a first entity 810 for sake of discussion. As an example, the satellite communication service may be a narrowband satellite communication service that is designed to support relatively low data rate transmissions. In one instantiation, the satellite communications service may be, for example, a Commercial Satellite Communications (COMSATCOM) service, and as an instance, these services are often provided by commercial satellite communication providers and leased or contracted by the DoD for various communication needs. Narrowband COMSATCOM services typically involve communication over narrow frequency bands or channels, which are suitable for voice communications, messaging, and low-data-rate applications. These services are especially useful for tasks such as secure voice communication, text messaging, and data transfer in situations where high data bandwidth is not required.

The satellite communication service may be provided to the first entity 810 via a first constellation of satellites, and at a given time, be provided at a "first service level" or first level of service that is bound by defined levels of performance. As an example, the first service level may have first defined levels of quality, availability, and/or reliability of the satellite communication service being provided. To achieve the defined levels, the first service level provides a first set of resources that are assigned to the first entity 810. The first set of resources are adequate to satisfy the first defined levels of quality, availability, and/or reliability of the satellite communication service being provided.

In accordance with the method (FIG. 9 at 900), at process 910, a core network 820 of the constellation of satellites may continuously monitor, via monitoring process 830, the usage of first set of resources by the first entity 810 and determine, at process 930, whether a current demand for resources exceeds capability of the first set of resources provided under the first service level.

At process 930, When the current demand for resources exceeds capability of the first set of resources provided under the first service level (e.g., during a high demand period), a scheduling controller 840 may assign additional resources to the first entity 810 in addition to the first set of resources specified by the first service level. In combination with the first set of resources, the additional resources are adequate to satisfy second defined levels of quality, availability, and reliability of the satellite communication service that are greater than the first defined levels of quality, availability, and reliability of the satellite communication service.

The additional resources may include one or more of: a different coverage area (e.g., a different shape of the coverage footprint and/or increased size of the coverage footprint that better supports communication capabilities of the first entity 810); an increased capacity for communication capabilities of the first entity 810; and an improved quality of service. For example, the increased capacity supported for communication may include one or more of: an increased bandwidth for the satellite communication service being provided to improve communication capabilities of the first entity 810; an increased number of users associated with the first entity 810 that are capable of being supported for communication via the satellite communication service being provided; and an increased number of frequency bands or channels allocated for communication via the satellite communication service being provided.

In accordance with one aspect of the method (FIG. 9 at 900), and in one implementation of process 930, the additional resources may be provided by assigning additional resources from one or more satellites of the constellation of satellites to the first entity 810. For instance, in the context of a commercial constellation the first entity would already have control over all resources if it were a sovereign constellation. Should there be a need beyond "surge capacity", network provider can maintain ready for launch satellites and contract with launch providers to ensure near term launch availability.

In some implementations, the system is somewhat unique in that the satellites are so small and low mass. Up to 2,000 satellites could be launched on a medium sized rocket, and in one non-limiting example, 2,500 satellites are needed for a full constellation. If the first entity (e.g., DoD) would like to only use the commercial constellation, a contract could be made for surge capacity and maintenance of a larger commercial constellation. If the first entity would like reserve satellites for full constellation re-deployment, a full constellation of a minimum of 2,500 satellites and the requisite number of launches could be set aside for re-instantiation of the full 24/7 global network inside of 3 months. A satellite or group thereof may move between users even in a pattern behavior, such as when it is over a country, for instance. In such cases the payload will be dedicated 100% to that country. Thus, before it gets to that location memory of all history (e.g., call patterns, beam locations, users, etc.) is erased, which can allow the new user to take full control of the payload.

In other implementations, the constellation may vary depending on the implementation can be part of the same constellation or a different constellation.

For example, in accordance with one implementation of the method (FIG. 9 at 900), the first constellation of satellites includes a constellation of commercial satellites, and in one implementation of process 930, the additional resources may be provided by deploying of one or more additional commercial satellites that are added as part of the constellation of commercial satellites. In such implementations, the additional resources may be provided by the one or more additional commercial satellites that are assigned to or dedicated to the first entity 810. In some instances, a provided may ad satellites to its commercial constellation and if the first entity were to only utilize the commercial constellation, then the provider could, under contract include a larger capacity buffer which could be used during times of high demand or "surge" times. The core network 820 can dynamically notify the scheduling system to prioritize demand and use.

As another example, in accordance with another implementation of the method (FIG. 9 at 900), and in another implementation of process 930, the first constellation of satellites maybe a constellation of sovereign satellites that are associated with and assigned to the first entity 810. In some implementations, the additional resources may be provided by one or more commercial satellites that are part of a second constellation of commercial satellites, where the additional resources provided by the one or more commercial satellites are assigned to or dedicated to the first entity 810. In one example, if the first entity would like "surge" capacity from the sovereign constellation, a contract could be defined for timing and availability of managing surge capacity from the commercial constellation.

In some embodiments, the provider can allow for rapid (e.g., within 24 hours) surge capability in any theatre of activity. Specifically, the provider can operate a commercial constellation alongside a sovereign constellation. The provider can rapidly move satellites from the commercial constellation to the sovereign constellation in a similar manner that a data center can dynamically add compute power during high demand times.

As another example, in accordance with another implementation of the method (FIG. 9 at 900), and in another implementation of process 930, the first constellation of satellites is a constellation of sovereign satellites dedicated to the first entity 810, and the additional resources may be provided by deploying of one or more additional sovereign satellites that are added as part of the sovereign constellation of sovereign satellites. If the first entity would like its own private 100% sovereign constellation, then it will have control of all capacity across that system.

Figure 9:
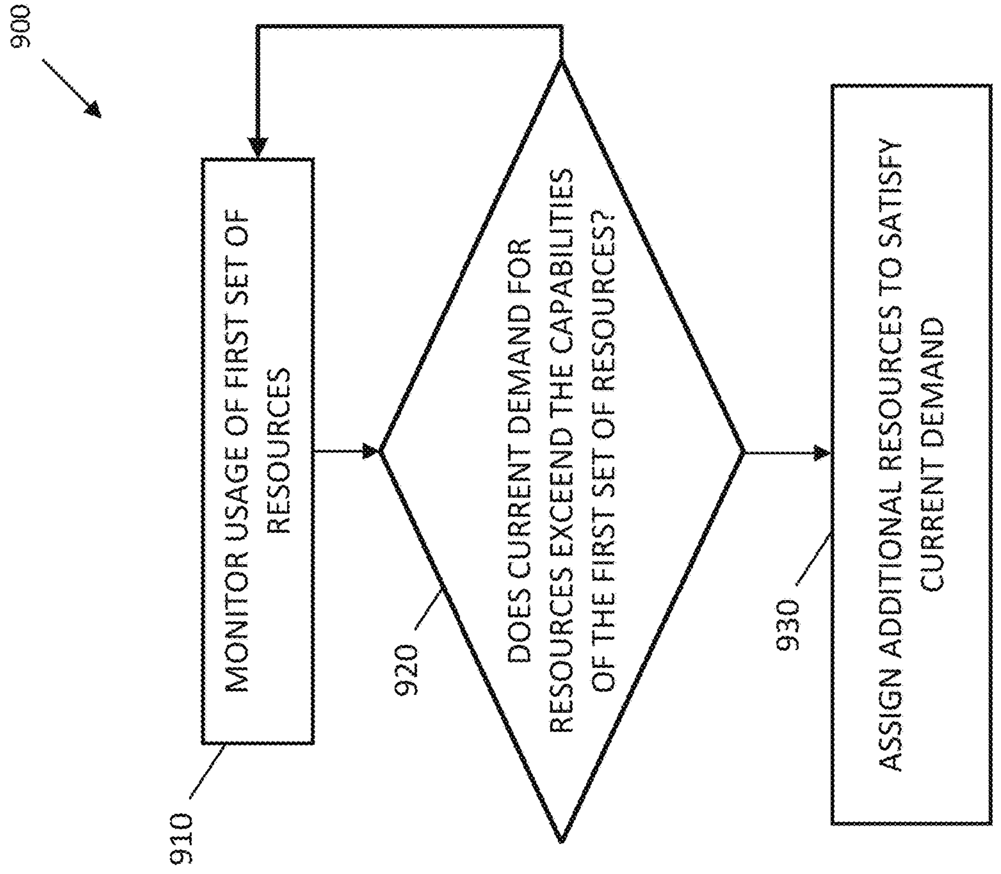
FIG. 9 is a flowchart illustrating one example of a method for rapid acquisition of additional resources for a satellite communications service that is provided to an entity, which may be referred to below as a first entity for sake of discussion according to aspects of the disclosed technology.

The service levels may be specified in a number of different ways depending on the implementation of the method (FIG. 9 at 900). For instance, the first service level may be specified by one or more of: the percentage of time that the satellite communication services will be available and operational; a maximum data rate or throughput that can be achieved for the services, an acceptable packet loss during data transmission, a maximum allowable latency or signal propagation delay for communication between terminals and a satellite, maximum jitter values, etc. Various other variables or parameters could be used to specify service levels depending on the implementation.

At process 920, the core network 820 may determine whether the current demand for resources exceeds capability of the first set of resources (that are provided under the first service level) by one or any combination of methods depending on the implementation of the method (FIG. 9 at 900).

For instance, in accordance with one implementation of the method (FIG. 9 at 900), and in one implementation of process 920, the core network 820 may predict, based on the current demand for resources by the first entity 810, a future demand for resources by the first entity 810 and determine whether the predicted demand for resources exceeds capability of the first set of resources provided under the first service level. In this sense, the future demand for resources is a "predicted demand" for resources.

In accordance with another implementation of the method (FIG. 9 at 900), and in another implementation of process 920, the core network 820 may determine whether the current demand for resources exceeds capability of the first set of resources provided under the first service level by analyzing current network traffic in real-time or near real-time to identify increases in demand for satellite communication service.

In accordance with another implementation of the method (FIG. 9 at 900), and in another implementation of process 920, the core network 820 may determine whether the current demand for resources exceeds capability of the first set of resources provided under the first service level by analyzing current network traffic patterns to predict future demand for resources and to identify increases in future demand for satellite communication service.

In accordance with another implementation of the method (FIG. 9 at 900), and in another implementation of process 920, the core network 820 may determine whether the current demand for resources exceeds capability of the first set of resources provided under the first service level by analyzing utilization of satellite transponders to determine how much capacity is being used to identify trends to identify usage trends and adjusting resources accordingly.

In accordance with another implementation of the method (FIG. 9 at 900), and in another implementation of process 920, the core network 820 may determine whether the current demand for resources exceeds capability of the first set of resources provided under the first service level by analyzing, via machine learning and/or predictive analytics, data to predict and identify patterns related to high-demand periods (and future demand) for the satellite communication service. For example, data including various demand variables and/or historical data on usage of the narrowband satellite communication service.

In accordance with another implementation of the method (FIG. 9 at 900), and in another implementation of process 920, the core network 820 may determine whether the current demand for resources exceeds capability of the first set of resources provided under the first service level by processing a request from the first entity 810 for additional resources to satisfy changing operational requirements to ensure that the satellite communication service meets operational needs of the first entity 810.

Other embodiments of this aspect include corresponding computer system 800s, apparatus, and computer programs recorded on one or more computer storage devices, each configured to perform the actions of the method 900 (FIG. 9). For example, in one aspect, a system 800 for rapid acquisition of additional resources for a satellite communications service is provided that includes at least one hardware-based processor and memory, wherein the memory comprises processor-executable instructions encoded on a non-transient processor-readable media, and the processor-executable instructions, when executed by the processor, configure the system 800 to perform the method 900 (FIG. 9) described herein. In another aspect, a non-transitory computer-readable medium is provided that stores a set of instructions for rapid acquisition of additional resources for a satellite communications service. The set of instructions comprise instructions that, when executed by one or more processors of a device, cause the device to perform the method 900 (FIG. 9) described herein.

Figure 10:
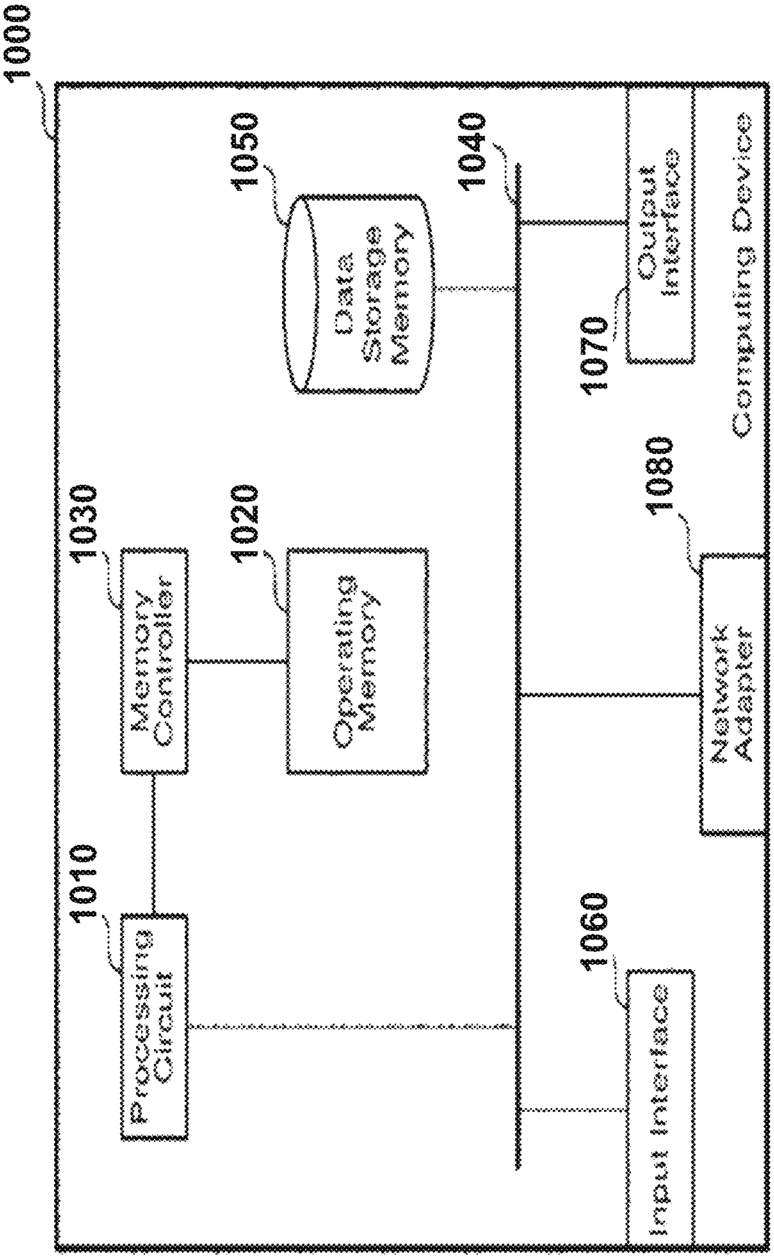
FIG. 10 is a diagram illustrating one example of computing device in which aspects of the technology may be practiced.

FIG. 10 is a diagram illustrating one example of computing device 1000 in which aspects of the technology may be practiced. Computing device 1000 may be virtually any type of general-purpose or specific-purpose computing device. For example, computing device 1000 may be an example of a flight computer 202, a computing system or device associated with either entity 310, 320, a computing device or system of the ground station 402, as described above with reference to FIGS. 2A-7, or a core network 820, as escribed above with reference to FIGS. 8 and 9.

As illustrated in FIG. 10, computing device 1000 includes processing circuit 1010, operating memory 1020, memory controller 1030, data storage memory 1050, input interface 1060, output interface 1070, and network adapter 1080. Each of these afore-listed components of computing device 1000 includes at least one hardware element.

Computing device 1000 includes at least one processing circuit 1010 configured to execute instructions, such as instructions for implementing the herein-described workloads, processes, or technology. Processing circuit 1010 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 1020 during run-time of computing device 1000. Operating memory 1020 may also include any of a variety of data storage devices/components, such as volatile memories, semi-volatile memories, random access memories, static memories, caches, buffers, or other media used to store run-time information. In one example, operating memory 1020 does not retain information when computing device 1000 is powered off. Rather, computing device 1000 may be configured to transfer instructions from a non-volatile data storage component (e.g., data storage component 1050) to operating memory 1020 as part of a booting or other loading process. In some examples, other forms of execution may be employed, such as execution directly from data storage component 1050.

Operating memory 1020 may include 4th generation double data rate (DDR4) memory, 3rd generation double data rate (DDR3) memory, other dynamic random access memory (DRAM), High Bandwidth Memory (HBM), Hybrid Memory Cube memory, 3D-staked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 1010 via memory controller 1030 in channels. One example of computing device 1000 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 1020 specifically does not include or encompass communications media, any communications medium, or any signals per se.

Memory controller 1030 is configured to interface processing circuit 1010 to operating memory 1020. For example, memory controller 1030 may be configured to interface commands, addresses, and data between operating memory 1020 and processing circuit 1010. Memory controller 1030 may also be configured to abstract or otherwise manage certain aspects of memory management from or for processing circuit 1010. Although memory controller 1030 is illustrated as single memory controller separate from processing circuit 1010, in other examples, multiple memory controllers may be employed, memory controller(s) may be integrated with operating memory 1020, or the like. Further, memory controller(s) may be integrated into processing circuit 1010. These and other variations are possible.

In computing device 1000, data storage memory 1050, input interface 1060, output interface 1070, and network adapter 1080 are interfaced to processing circuit 1010 by bus 1040. Although, FIG. 10 illustrates bus 1040 as a single passive bus, other configurations, such as a collection of buses, a collection of point-to-point links, an input/output controller, a bridge, other interface circuitry, or any collection thereof may also be suitably employed for interfacing data storage memory 1050, input interface 1060, output interface 1070, or network adapter 1080 to processing circuit 1010.

In computing device 1000, data storage memory 1050 is employed for long-term non-volatile data storage. Data storage memory 1050 may include any of a variety of non-volatile data storage devices/components, such as non-volatile memories, disks, disk drives, hard drives, solid-state drives, or any other media that can be used for the non-volatile storage of information. However, data storage memory 1050 specifically does not include or encompass communications media, any communications medium, or any signals per se. In contrast to operating memory 1020, data storage memory 1050 is employed by computing device 1000 for non-volatile long-term data storage, instead of for run-time data storage.

Also, computing device 1000 may include or be coupled to any type of processor-readable media such as processor-readable storage media (e.g., operating memory 1020 and data storage memory 1050) and communication media (e.g., communication signals and radio waves). While the term processor-readable storage media includes operating memory 1020 and data storage memory 1050, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 1000 also includes input interface 1060, which may be configured to enable computing device 1000 to receive input from users or from other devices. In addition, computing device 1000 includes output interface 1070, which may be configured to provide output from computing device 1000.

In the illustrated example, computing device 1000 is configured to communicate with other computing devices or entities via network adapter 1080. Network adapter 1080 may include a wired network adapter, e.g., an Ethernet adapter, a Token Ring adapter, or a Digital Subscriber Line (DSL) adapter. Network adapter 1080 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 1000 is illustrated with certain components configured in a particular arrangement, these components and arrangement are merely one example of a computing device in which the technology may be employed. In other examples, data storage memory 1050, input interface 1060, output interface 1070, or network adapter 1080 may be directly coupled to processing circuit 1010, or be coupled to processing circuit 1010 via an input/output controller, a bridge, or other interface circuitry. Other variations of the technology are possible.

Some examples of computing device 1000 include at least one memory (e.g., operating memory 1020) adapted to store run-time data and at least one processor (e.g., processing unit 1010) that is adapted to execute processor-executable code that, in response to execution, enables computing device 1000 to perform actions, where the actions may include, in some examples, actions for one or more methodologies or processes described herein, such as, method 400 of FIGS. 4A and 4B, method 500 of FIG. 5, method 600 of FIG. 6, method 700 of FIG. 7, as described above.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters and configurations described herein are meant to be exemplary and that the actual parameters and configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer may be utilized to execute the software code or instructions via its processors. Such computers may be interconnected by one or more networks in any suitable form, including a local area network or a wide area network. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

A state machine is a device that may be implemented in electrical circuitry and/or program code executing in a processor, which at any particular time can be in one of a set number of stable conditions depending on its previous condition and on the present values of its inputs. The performance of state machines is typically related to the dependence of each input on the previous state.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an example embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an example embodiment," "an exemplary embodiment," or "other embodiments," or the like, are not necessarily all referring to the same embodiments. References in the specification to "an embodiment," "one embodiment," "some embodiments," "one particular embodiment," "an example embodiment," "an exemplary embodiment," or "other embodiments," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

The description and illustration of various embodiments of the disclosure are examples and the disclosure is not limited to the exact details shown or described. While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed:

1. A method for rapid acquisition of additional resources for a satellite communications service, the method comprising:

providing, to a first entity, the satellite communication service via a first constellation of satellites at a first service level having first defined levels of quality, availability, and reliability of the satellite communication service being provided, and wherein the first service level provides a first set of resources assigned to the first entity that are adequate to satisfy the first defined levels of quality, availability, and reliability of the satellite communication service being provided;

continuously monitoring, at a core network of the constellation of satellites, usage of first set of resources by the first entity;

determining, at the core network, whether a current demand for resources exceeds capability of the first set of resources provided under the first service level; and assigning, at a scheduling controller when the current demand for resources exceeds capability of the first set of resources provided under the first service level during a high demand period, additional resources to the first entity in addition to the first set of resources specified by the first service level, wherein the additional resources in combination with the first set of resources are adequate to satisfy second defined levels of quality, availability, and reliability of the satellite communication service that is greater than the first defined levels of quality, availability, and reliability of the satellite communication service.

2. The method of claim 1, wherein the additional resources comprise one or more of:

a different coverage area;

an increased capacity for communication capabilities of the first entity; and an improved quality of service.

3. The method of claim 2, wherein the increased capacity supported for communication comprises one or more of:

an increased bandwidth for the satellite communication service being provided to improve communication capabilities of the first entity;

an increased number of users associated with the first entity that are capable of being supported for communication via the satellite communication service being provided; and an increased number of frequency bands or channels allocated for communication via the satellite communication service being provided.

4. The method of claim 1, wherein the first service level is specified by one or more of: percentage of time that the satellite communication services will be available and operational; maximum data rate or throughput that can be achieved for the services; and acceptable packet loss during data transmission.

5. The method of claim 4, wherein the first service level is further specified by one or more of: maximum allowable latency or signal propagation delay for communication between terminals and a satellite; and maximum jitter values.

6. The method of claim 1, wherein determining, at the core network, whether the current demand for resources exceeds capability of the first set of resources provided under the first service level, further comprises:
- predicting, based on the current demand for resources by the first entity, a future demand for resources by the first entity, wherein the future demand for resources is a predicted demand for resources; and
- determining, at the core network, whether the predicted demand for resources exceeds capability of the first set of resources provided under the first service level.

7. The method of claim 1, wherein the core network determines whether the current demand for resources exceeds capability of the first set of resources provided under the first service level by:
- analyzing current network traffic in real-time or near real-time to identify increases in demand for satellite communication service.

8. The method of claim 1, wherein the core network determines whether the current demand for resources exceeds capability of the first set of resources provided under the first service level by:
- analyzing current network traffic patterns to predict future demand for resources and to identify increases in future demand for satellite communication service.

9. The method of claim 1, wherein the core network determines whether the current demand for resources exceeds capability of the first set of resources provided under the first service level by:
- analyzing utilization of satellite transponders to determine how much capacity is being used to identify trends to identify usage trends.

10. The method of claim 1, wherein the core network determines whether the current demand for resources exceeds capability of the first set of resources provided under the first service level by:
- analyzing, via machine learning or predictive analytics, data to predict and identify patterns related to high-demand periods for the satellite communication service.

11. The method of claim 1, wherein the core network determines whether the current demand for resources exceeds capability of the first set of resources provided under the first service level by:
- processing a request from the first entity for additional resources to satisfy changing operational requirements to ensure that the satellite communication service meets operational needs of the first entity.

12. The method of claim 1, wherein the additional resources are provided by assigning additional resources from one or more satellites of the constellation of satellites to the first entity.

13. The method of claim 1, wherein the first constellation of satellites is a constellation of commercial satellites, and wherein the additional resources are provided by deploying of one or more additional commercial satellites that are added as part of the constellation of commercial satellites, wherein the additional resources provided by the one or more additional commercial satellites are dedicated to the first entity.

14. The method of claim 1, wherein the first constellation of satellites is a constellation of sovereign satellites of the first entity, and wherein the additional resources are provided by one or more commercial satellites that are part of a second constellation of commercial satellites, wherein the additional resources provided by the one or more commercial satellites are dedicated to the first entity.

15. The method of claim 1, wherein the first constellation of satellites is a constellation of sovereign satellites dedicated to the first entity, and wherein the additional resources are provided by deploying of one or more additional sovereign satellites that are added as part of the sovereign constellation of sovereign satellites.

16. The method of claim 1, wherein the satellite communication service is a narrowband satellite communication service that is designed to support relatively low data rate transmissions.

17. A system for rapid acquisition of additional resources for a satellite communications service comprising:
- at least one hardware-based processor and memory, wherein the memory comprises processor-executable instructions encoded on a non-transient processor-readable media, wherein the processor-executable instructions, when executed by the processor, configure the system to:
  - provide, to a first entity, the satellite communication service via a first constellation of satellites at a first service level having first defined levels of quality, availability, and reliability of the satellite communication service being provided, and wherein the first service level provides a first set of resources assigned to the first entity that are adequate to satisfy the first defined levels of quality, availability, and reliability of the satellite communication service being provided;
  - continuously monitor, at a core network of the constellation of satellites, usage of first set of resources by the first entity;
  - determine, at the core network, whether a current demand for resources exceeds capability of the first set of resources provided under the first service level; and
  - assign, at a scheduling controller when the current demand for resources exceeds capability of the first set of resources provided under the first service level during a high demand period, additional resources to the first entity in addition to the first set of resources specified by the first service level,
  - wherein the additional resources in combination with the first set of resources are adequate to satisfy second defined levels of quality, availability, and reliability of the satellite communication service that is greater than the first defined levels of quality, availability, and reliability of the satellite communication service.

18. The system of claim 17, wherein the additional resources comprise one or more of:
- a different coverage area;
- an increased capacity for communication capabilities of the first entity; and
- an improved quality of service.

19. The system of claim 17, wherein the first service level is specified by one or more of:

percentage of time that the satellite communication services will be available and operational;

maximum data rate or throughput that can be achieved for the services; and acceptable packet loss during data transmission;

maximum allowable latency or signal propagation delay for communication between terminals and a satellite; and maximum jitter values.

20. A non-transitory computer-readable medium storing a set of instructions for rapid acquisition of additional resources for a satellite communications service, the set of instructions comprising:

one or more instructions that, when executed by one or more processors of a device, cause the device to:

provide, to a first entity, the satellite communication service via a first constellation of satellites at a first service level having first defined levels of quality, availability, and reliability of the satellite communication service being provided, and wherein the first service level provides a first set of resources assigned to the first entity that are adequate to satisfy the first defined levels of quality, availability, and reliability of the satellite communication service being provided;

continuously monitor, at a core network of the constellation of satellites, usage of first set of resources by the first entity;

determine, at the core network, whether a current demand for resources exceeds capability of the first set of resources provided under the first service level; and assign, at a scheduling controller when the current demand for resources exceeds capability of the first set of resources provided under the first service level during a high demand period, additional resources to the first entity in addition to the first set of resources specified by the first service level, wherein the additional resources in combination with the first set of resources are adequate to satisfy second defined levels of quality, availability, and reliability of the satellite communication service that is greater than the first defined levels of quality, availability, and reliability of the satellite communication service.

* * * * *